United States Patent [19]

Wekenmann et al.

[11] Patent Number: 5,415,689
[45] Date of Patent: May 16, 1995

[54] TWO-COMPONENT EPOXY RESIN/ZINC DUST PRIMING COAT FOR STEEL SURFACES

[75] Inventors: Guido Wekenmann, deceased, late of Ludwigsburg, by Dorothee Wekenmann, Dominik G. Wekenmann, Monika J. Wekenmann, heirs; Sabine Zipperlen, nee Harenz, Stuttgart; Axel Petrikat, Ludwigsburg, all of Germany

[73] Assignee: Sika Chemie GmbH, Stuttgart, Germany

[21] Appl. No.: 70,330

[22] PCT Filed: Oct. 25, 1991

[86] PCT No.: PCT/EP91/02024
§ 371 Date: May 27, 1993
§ 102(e) Date: May 27, 1993

[87] PCT Pub. No.: WO92/09664
PCT Pub. Date: Jun. 11, 1992

[30] Foreign Application Priority Data

Nov. 27, 1990 [DE] Germany .................. 40 37 599.4

[51] Int. Cl.⁶ .............................................. C09D 5/10
[52] U.S. Cl. ........................... 106/14.15; 106/14.11; 106/14.41; 106/14.42; 106/14.44; 523/402; 523/406; 523/459
[58] Field of Search ............ 106/14.44, 14.11, 14.15, 106/14.41, 14.42; 523/402, 406, 459

[56] References Cited

U.S. PATENT DOCUMENTS

| | | | |
|---|---|---|---|
| 3,408,318 | 10/1968 | Madison | 523/401 |
| 3,944,712 | 3/1976 | Kurcz | 428/418 |
| 3,998,771 | 12/1976 | Feneis, Jr. et al. | 523/442 |
| 4,476,260 | 10/1984 | Salensky | 523/402 |
| 4,544,688 | 1/1985 | Anderson et al. | 523/458 |
| 5,001,173 | 3/1991 | Solensky et al. | 523/406 |

FOREIGN PATENT DOCUMENTS

| | | |
|---|---|---|
| 0157392 | 10/1985 | European Pat. Off. . |
| 0196835 | 10/1986 | European Pat. Off. . |
| 385880 | 9/1990 | European Pat. Off. . |
| 0519212 | 3/1970 | Germany . |
| 1669174 | 7/1971 | Germany . |
| 2353701 | 5/1975 | Germany . |
| 2615658 | 10/1976 | Germany . |
| 2831269 | 1/1980 | Germany . |
| 3130929 | 6/1982 | Germany . |
| 3232755 | 3/1984 | Germany . |
| 3531370 | 3/1987 | Germany . |

OTHER PUBLICATIONS

Epikote–Harze, Deutsche Farben–Zeitschrift (pp. 463–470) by Von Dr. L. Korfhage (1955) no month.

*Primary Examiner*—Anthony J. Green
*Attorney, Agent, or Firm*—Flynn, Thiel, Boutell & Tanis

[57] ABSTRACT

In order to obtain a two-component epoxy resin/zinc dust priming coat which for ecological reasons requires little or no solvent, the powdery or flaky zinc, reactive in water, is dispersed in a water-free, water emulsible epoxy resin binder (component A). Component A is mixed immediately before being applied with a water-diluted or water-dissolved polyamine hardener (component B).

9 Claims, No Drawings

TWO-COMPONENT EPOXY RESIN/ZINC DUST PRIMING COAT FOR STEEL SURFACES

DESCRIPTION

The invention relates to an anticorrosive zinc-containing undercoating agent for steel surfaces.

It is known to use zinc dust and/or zinc flakes as a corrosion-inhibiting pigment in organic undercoating agents. The undercoating agents consist essentially of a synthetic resin which is dissolved in an organic solvent in order to have a soft consistency during use. Aromatic hydrocarbons, like xylol, are primarily considered as organic solvents. The undercoating agent is stored in its liquid form in closed containers and is delivered in this manner. For a specified use, it is directly applied to the previously cleaned steel surface. By evaporating the solvent, the mixture hardens and forms a solid closed layer in which the zinc dust is contained in a finely distributed form. When moist air penetrates into the undercoating, mainly basic zinc carbonate ($4ZnO \cdot CO_2 \cdot 4H_2O$) forms on the zinc flakes, which results during an increase in volume and in an increase in the density of the undercoating and protects the steel surface lying therebelow from destruction. A further anticorrosive effect is due to the cathodic protective action of the zinc dust pigment.

Considerable amounts of organic solvents are emitted into the surrounding air during the application of the known zinc dust undercoating agents. In order to avoid this disadvantage, it is known (EP-A-0 385 880) to use, in a two-component corrosion-inhibiting agent as the first reaction component, a powder-like or flake-like zinc, which is dispersed in an organic liquid containing a water-free, water-emulsifiable epoxy resin binding agent, and a second reaction component (component B) consisting of a water-diluted or water-dissolved polyamine hardener, which reaction components can be mixed with one another to form a viscous hardenable coating compound. The component A also contains a glycolether as a water-soluble organic solvent and silicic acid of a crystaline or amorphous consistency. The glycolether has obviously the function of improving the water emulsibility of the epoxy resin binding agent. The hardening of the coating compound will be delayed on the other hand because of the softening characteristic of the glycolether. The coating compound remains therefore sticky until complete hardening so that in a dusty environment, surface contamination must be feared during the drying process.

Starting out from this, the basic purpose of the invention is to improve the known undercoating agent of the above-disclosed type such that the undercoating agent dries quicker.

In order to achieve this, the invention suggests that the organic liquid of the first reaction component (component A) contains a synthetic resin additive which is liquidy and/or dissolved in an organic solvent, which speeds up the drying process of the coating compound by evaporation of the organic solvent or by reaction with the second reaction component or with oxygen.

The synthetic resin additive of the invention has mainly the purpose of speeding up the drying by evaporating the organic solvent or by reacting with the hardener or with oxygen. Thus, the synthetic resin forms a type of a structure holding the system together and results in a surface drying as long as the reaction of the epoxy resin binding agent with the polyamine has not concluded.

As synthetic resins can be considered
hydrocarbon resins dissolved in organic solvents, like ketonic resins, aldehyde resins and phenolic resins,
resins, which have a group reactive with the amine group, in particular an epoxy group, a carboxyl group and an isocyanate group,
oxidatively drying systems, in particular alkyd resins.

In as far as the synthetic resins contain a portion of an organic solvent, such portion is only a fraction of the portion of the solvent in known two-component undercoating agents.

The epoxy resin binding agent contains preferably bisphenol A-resins and/or bisphenol AF-resins.

The undercoating agent of the invention has according to a preferred embodiment of the invention the following composition:

Component A
1 to 20 percent by weight of water emulsifiable epoxy resin on the basis of bisphenol A and/or bisphenol AF;
up to 10 percent by weight of hydrophobic and/or hydrophilic synthetic resins, like hydrocarbon resin;
0 to 10% organic solvent, like xylol; 10 to 95 percent by weight of zinc powder or zinc flakes;
0 to 90 percent by weight of extenders, in particular talcum, barium sulfate and/or mica;

Component B
1 to 5 percent by weight of polyamine;
5 to 15 percent by weight of water; and the remainder
Additives like anti-settling agents, defoamers, thixotropic agents or wetting agents.

The water contained in the component B complete or partially replaces in the undercoating agent of the invention the otherwise common organic solvent with respect to its function of reducing the viscosity during use. The polyamines, which are used according to the invention, are mainly of an aliphatic nature and must have a balance between hydrophilicity and hydrophobicity in order to guarantee a good hardening with the epoxy resin. Water emulsifiable epoxy resins and polyamines must, in addition, be adjusted stoichiometrically with one another in their proportions.

The good corrosion-inhibiting characteristics of the undercoating agent produced in this manner are only possible because the water-reactive zinc powder is essentially shielded against the penetration of water by the initially water-free epoxy resin binding agent during the relatively short time of application.

EXEMPLARY EMBODIMENT 1

100 parts by weight of a homogeneously dispersed mixture of 89.0 parts by weight of zinc dust and 7.5 parts by weight of a mixture of a water emulsifiable epoxy resin and water-dilutable phenol resin in a 1:1 relationship and 3.5 parts by weight of xylol as component A were mixed with 8.2 parts by weight of a polyamine, which polyamine is dissolved in water to provide a 30% weight percentage solution (component B), to form a workable viscous coating compound.

EXEMPLARY EMBODIMENT 2

100 parts by weight of a homogeneously dispersed mixture of 86 parts by weight of zinc dust and 9.5 parts by weight of a mixture of a water emulsifiable epoxy resin and a solvent-containing ketonic resin solution (60%) in a 1:1.3 relationship, and 4.5 parts by weight of a talcum extender as component A were mixed with 12.4 parts by weight of a polyamine, which is dissolved in water to provide a 20% weight percentage solution (component B), to form a workable viscous coating compound.

EXEMPLARY EMBODIMENT 3

Like the exemplary embodiment 2 with the difference that the component A contains 90.5 parts by weight of zinc dust and no extender.

EXEMPLARY EMBODIMENT 4

Like the exemplary embodiment 2 with the difference being that in place of the ketonic resin solution, an oxidatively drying short-chain alkyd resin, on the basis of vegetable fatty acids in a 3:0.5 relationship, is used.

The coating compound produced according to the exemplary embodiments 1 to 4 were each applied to a cleaned steel surface as the undercoating. By hardening the synthetic resin parts, it was dust dry after a few minutes. After a drying time of one week at a temperature of 23° C. and 50% humidity, it was subjected to the salt spray test according to DIN 50021-SS. The steel surface did not show any rusty-spot formation whatsoever thereafter, as it is otherwise common in the case of water-based corrosion-inhibiting coatings.

We claim:

1. An anticorrosive zinc-containing undercoating composition for steel surfaces comprising a first reaction component containing 1 to 20 percent by weight of a water-emulsifiable epoxy resin, a synthetic resin in an amount not exceeding 10 percent by weight in a liquid state or dissolved in an organic solvent, the amount of the organic solvent not exceeding 10 percent by weight, and 10 to 95 percent by weight of particulate zinc in the form of powder or flakes and a second reaction component containing 1 to 5 percent by weight of a polyamine and 5 to 15 percent by weight of water.

2. The undercoating composition according to claim 1, wherein said synthetic resin is a hydrocarbon resin.

3. The undercoating composition according to claim 2, wherein the hydrocarbon resin is selected from the group consisting of ketonic resins, aldehyde resins and phenol resins.

4. The undercoating composition according to claim 1, wherein said synthetic resin has a group which is reactive with said polyamine of said second reaction component.

5. The undercoating composition according to claim 4, wherein said reactive group is an epoxy group, carboxyl group or isocyanate group.

6. The undercoating composition according to claim 1, wherein said synthetic resin is an alkyd resin.

7. The undercoating composition according to claim 1, wherein said epoxy resin is selected from the group consisting of bisphenol-A resins and bisphenol-AF resins.

8. The undercoating composition according to claim 2, wherein said hydrocarbon resin is dissolved in xylol.

9. The undercoating composition according to claim 1, wherein said first reaction component additionally contains from 0 to 90 percent by weight of an extender selected from the group consisting of talcum, barium sulfate and mica.

* * * * *